United States Patent [19]

Alworth et al.

[11] 4,343,200

[45] Aug. 10, 1982

[54] REVERSING ATTACHMENT FOR DIAMOND THREAD SCREW

[76] Inventors: James Alworth, Rte. 58, West Redding, Conn. 06896; John C. Kennedy, 930 Orange Center Rd., Orange, Conn. 06477; Berger La Barre, 42 Maple Ave., Bethel, Conn. 06801; Gus Sandin, 45 Westville Ave., Danbury, Conn. 06810

[21] Appl. No.: 185,170

[22] Filed: Sep. 8, 1980

[51] Int. Cl.³ .................. F16H 25/12; F16H 29/20
[52] U.S. Cl. .................. 74/57; 74/89.15; 74/424.8 R
[58] Field of Search .................. 74/57–59, 74/89, 89.15, 127, 424.8 R, 424.8 A

[56] References Cited

U.S. PATENT DOCUMENTS

| | | | |
|---|---|---|---|
| 1,734,649 | 11/1929 | Shull | 74/57 |
| 2,441,596 | 5/1948 | Reitter | 74/57 |
| 2,527,985 | 10/1950 | Burroway | 52/712 |
| 2,936,645 | 5/1960 | Morris et al. | 74/424.8 R |
| 3,029,660 | 4/1962 | Sears | 74/424.8 R |
| 3,036,810 | 5/1962 | Conrad et al. | 74/58 |
| 3,768,745 | 10/1973 | Koller | 74/57 |
| 4,031,765 | 6/1977 | Metz | 74/57 |

FOREIGN PATENT DOCUMENTS 673478 11/1963 Canada .................. 74/424.8 R

*Primary Examiner*—Lawrence J. Staab
*Attorney, Agent, or Firm*—H. Gibner Lehmann; K. Gibner Lehmann

[57] ABSTRACT

A reversing attachment adapted to be applied to a diamond thread screw of the type having intersecting thread grooves, for effecting reversal in the axial direction of travel of a follower associated with the screw, the reversal occurring at any one of a number of predetermined points along the length thereof. The attachment is in the form of an abutment which is positioned at a groove intersection, and which is arranged to engage a driving element of the follower as the latter approaches the abutment so as to prevent passage of the driving element past the intersection. In accomplishing the reversal, the drive element is directly engaged by the abutment, and is caused to shift axially with respect to the follower such that the element transfer from one groove of the diamond thread screw to the oppositely-directed groove. The abutment is releasably carried by the screw, and can be merely snapped in place at the desired point along its length so as to enable the reciprocating stroke of the follower to be varied between two arbitrary points that are essentially independent of the locations of the ends of the screw thread.

14 Claims, 22 Drawing Figures

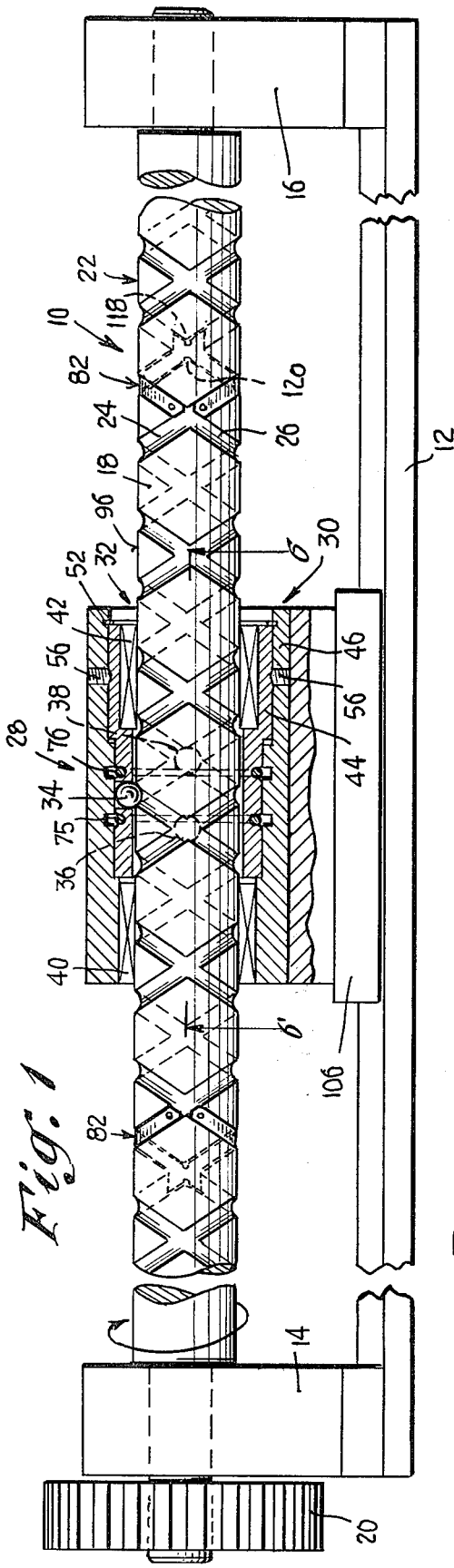

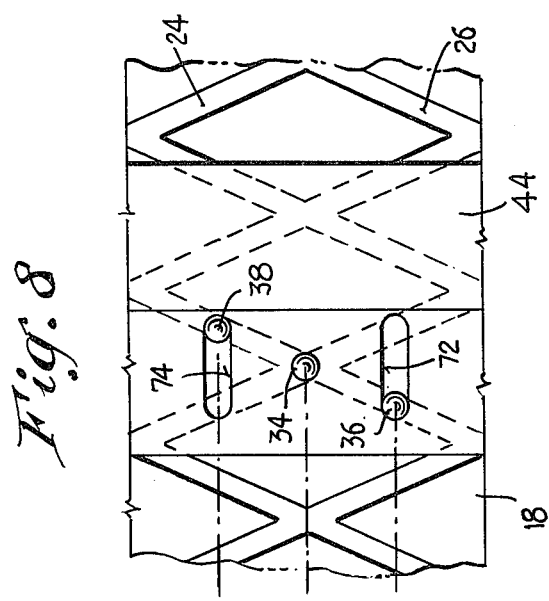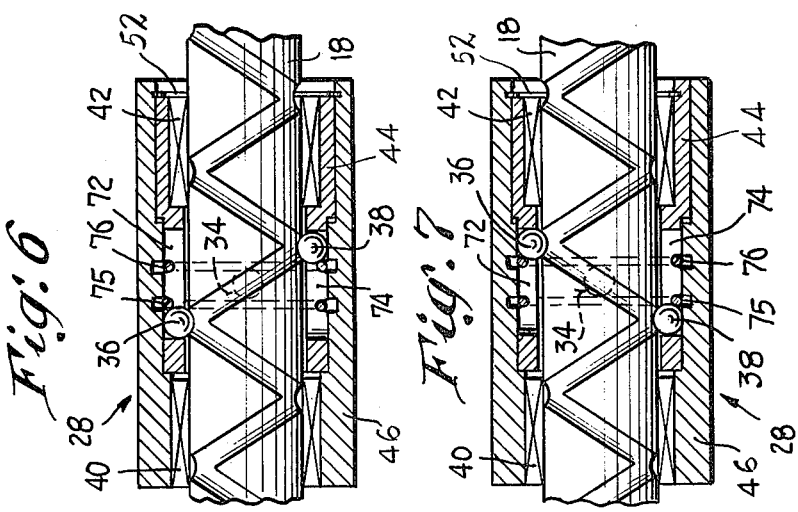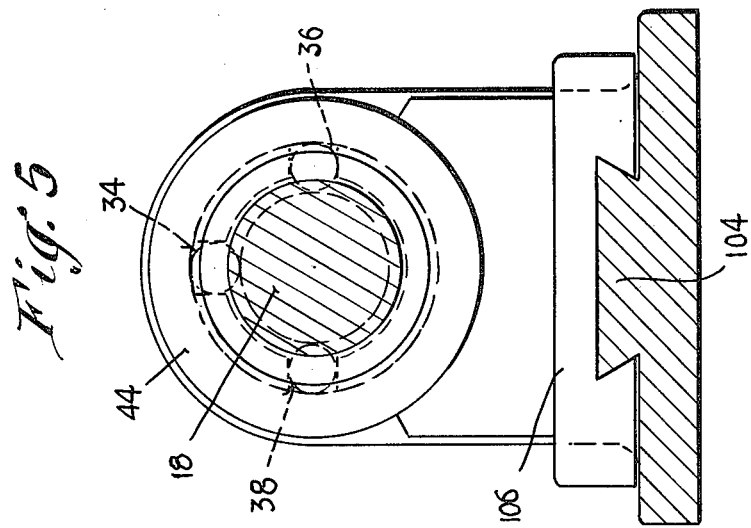

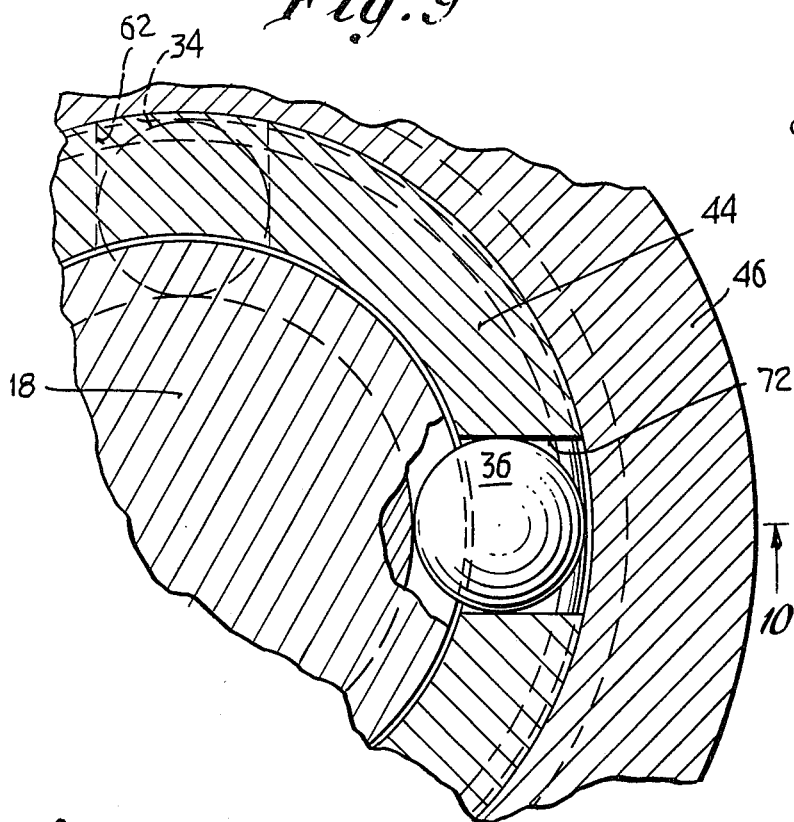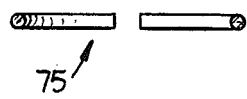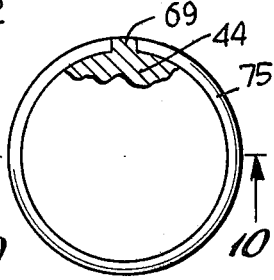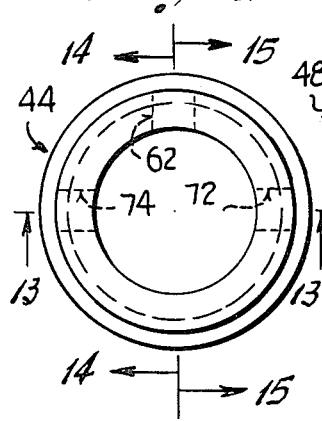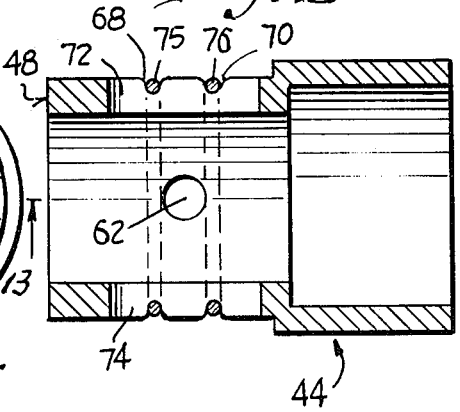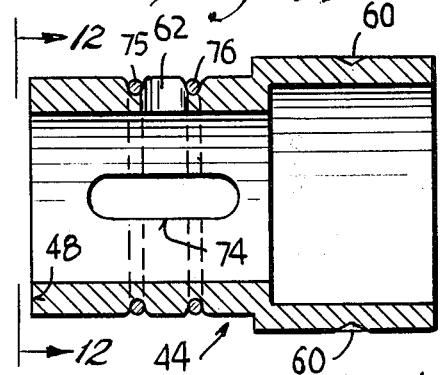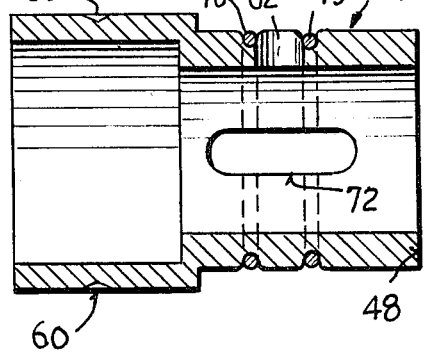

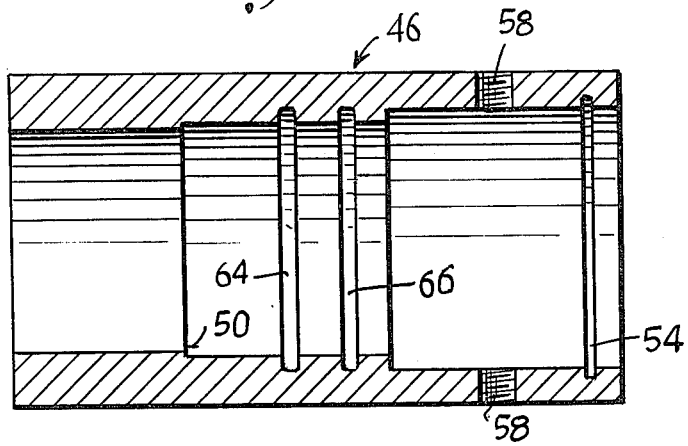
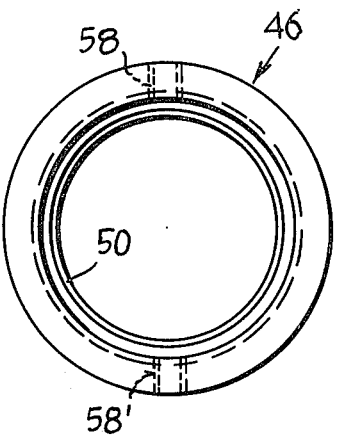
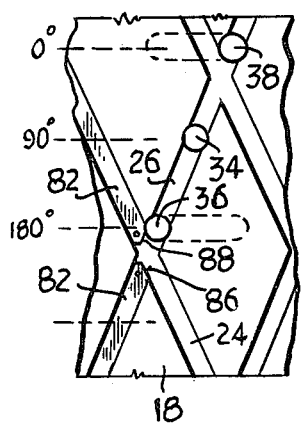
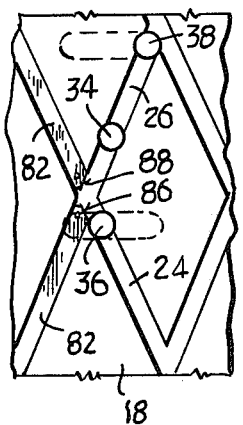
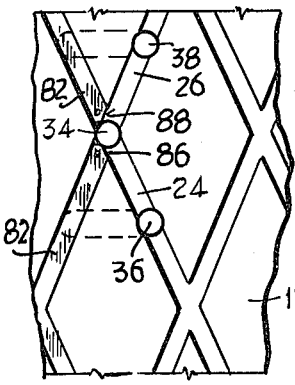
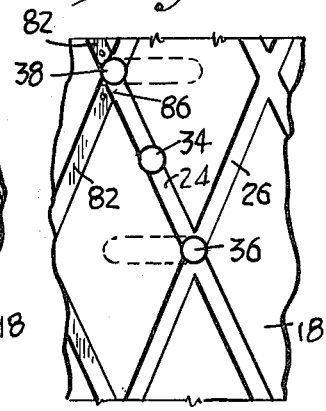
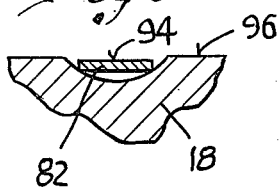

REVERSING ATTACHMENT FOR DIAMOND THREAD SCREW

BACKGROUND

This invention relates generally to traverse mechanisms of the type incorporating a diamond thread screw and a follower device associated therewith, wherein the follower and screw are intended to undergo reciprocating movement with respect to one another, all with a predetermined sense of relative rotation between two parts.

In the past a number of different reversing nut constructions for a diamond thread screw have been proposed and produced. Some of these incorporated annular nut bodies carrying multiple roller elements having generally conical tip portions which were adapted to engage the walls of a square thread formation. U.S. Pat. No. 3,779,094 issued Dec. 18, 1973 to Berger A. La Barre, and having common ownership with the present application, discloses one particular arrangement which was found to operate quite well. In the patented device, one roller was fixed axially with respect to the nut body, and additional rollers carried on slide blocks in the body were capable of being shifted axially from engagement with the walls of one groove of the diamond thread screw to the walls of the oppositely-directed groove, in order to change the axial direction of travel of the nut.

Suitable abutment means were provided for effecting the shifting of the rollers, as particularly illustrated in FIG. 10 of the patent. In one modification shown in FIG. 11, another type of abutment (156) was employed to shift the rollers, this arrangement incoporating a turnably-driven nut which drove a reciprocatable piston through the intermediary of the diamond thread screw.

While the device described above operated in a generally satisfactory manner, the shifting of the rollers had to be accomplished at precisely positioned intervals along the length of the diamond thread screw. That is, a roller could only be shifted axially of the nut body at such time as it entered an intersection of the right and left-hand grooves. Otherwise, jamming and malfunction would result. It has been found that with improper positioning of the abutments, there was a tendency for the rollers to run into the V-shaped tips of the diamond thread, sometimes resulting in snapping off of the said tips. Such an occurrence, of course, rendered the equipment inoperative, and necessitated either a repair of the chipped-off section or a complete replacement of the diamond thread screw. Even where breakage of the thread did not occur, there existed a tendency for excessive wear to occur if the abutment was not positioned at precisely the exact point along the length of the screw, such that little or no interference would be encountered between the roller and the V-shaped tips at the intersections of the thread grooves.

Still other reversing devices have been devised, incorporating roller arrangements adapted to perform specialized functions. One such arrangement is illustrated in U.S. Pat. No. 4,008,625 issued Feb. 22, 1977 to Surinder M. Malhotra, and having common ownership with the present application. This patented device involved tandem-connected nuts including spring means acting between them, arranged to reciprocate along a conventional screw. The effect of the spring was to bias the nuts in opposite axial directions with respect to one another, such that the rollers carried by one nut would engage one wall of the groove in the screw, with the rollers of the other nut engaging the opposite wall of the groove, this construction having the effect of minimizing or eliminating backlash. Also, slight variations in the thread lead along the length of the screw tended to be averaged out, resulting in better tracking of the nut over spaced-apart areas of the screw thread.

Additional devices involving diamond thread devices are illustrated in U.S. Pat. No. 4,022,076 issued May 10, 1977 to Joseph R. Metz, and U.S. Pat. No. 4,031,765 issued June 28, 1977 to Joseph R. Metz, both of these patents having common ownership with the present application. In U.S. Pat. No. '765, there is disclosed a traverse mechanism incorporating a diamond thread screw and nut follower, the follower carrying a series of thread-engaging balls which were adapted to ride in either the left or right-hand grooves of the screw. In this patented device, one ball was fixed with respect to the nut, with two additional balls on opposite sides of the fixed ball being capable of shifting axially of the nut body so as to enable the nut to reverse its axial direction of travel with respect to the screw, without reversing the sense of rotation of the latter.

U.S. Pat. No. '076 discloses a somewhat similar arrangement, except there is incorporated in the nut separate carriers for a series of balls, with the carriers being spring-biased toward one another in order to reduce or eliminate backlash. Reversal in the direction of travel of the nut was accomplished at the ends of the screw, wherein curved reversing grooves effected axial shifting of the appropriate balls.

While the devices described in the immediately preceding two patents operated in a satisfactory manner for their intended purposes, it can be appreciated that in these constructions the length of the stroke of the nut was fixed. That is, the nut was confined to movement along the full length of the screw in one direction until such time as it arrived at the reversing groove at one end of the screw, thereafter shifting direction and traveling again the full length of the screw. Because the length of the stroke was not adjustable, in most cases a particular screw had to be tailored to the proper length and thread pitch in order to achieve the desired stroke. The necessity for making up the diamond thread screw as a special part for each individual application resulted in extra equipment and expense, and thus constituted a distinct drawback where it was desired to provide a device which was flexible and adaptable to a number of different types of installations.

Efforts have been made to provide a reversing device incorporating ball-type roller elements wherein the nut could be reversed at a series of points along the length of the screw. One such arrangement is disclosed in U.S. application Ser. No. 038,478 filed May 14, 1979, the inventor being Joseph R. Metz, and this application having common ownership with the present application. In the reversing nut construction described in this co-pending application, there was provided an external cylindrical housing carrying an abutment pin (110) that could engage a trip pin (82) arranged to shift a ball element (70) carried by the nut.

It can be appreciated that the positioning of the abutment pin was critical, the location being so chosen as to begin shifting of the associated ball element at the proper time, that is, at such time as the ball was at an intersection of the thread grooves. Clearly, with an incorrect positioning of an abutment pin, there would result an attempt by the associated trip pin to shift the ball (70) at such time as it was not at an intersection, this, of course, causing jamming of the device, and malfunctioning or failure. Moreover, the number of individual parts required was seen to be relatively large, and their proper adjustment was sometimes found to be difficult to attain.

SUMMARY

The above disadvantages and drawbacks of prior reversing traverse mechanisms of the type having a diamond thread screw are obviated by the present invention, which has for an object the provision of a novel and improved diamond thread transmission and reversing attachment therefor which are simple in construction, reliable in operation, and which permit the points along the length of the screw shaft at which reversal occurs to be chosen in order to suit the requirements of a particular installation.

A related object of the invention is the provision of a transmission and reversing attachment as above characterized, wherein the attachment can be readily installed at the desired location, and even re-positioned if necessary, following installation, so as to produce the desired reversing characteristic.

Still another object is the provision of a reversing attachment which is physically small and light-weight, and which can be made in a form such that it lies substantially completely within the confines of the grooves of the diamond thread screw, so as to present little or no obstruction extending outside the major diameter of the screw, thus eliminating the possibility of the attachment becoming entangled or fouled in other equipment, or interfering with the body of the follower as the latter moves along the length of the screw.

A still further object of the invention is the provision of an attachment which can be constituted as a single spring metal stamping, so as to minimize the overall manufacturing expense.

Another object of the invention is the provision of an attachment which can be readily installed in its operative position by merely snapping it in place, and which thereafter remains fixed in position without the need for special fastenings, set screws, glues or cements, etc.

A still further object of the invention is the provision of an attachment which is so arranged that during normal operation, it engages only the driving element of the follower, and not other portions of the body thereof, this characteristic minimizing the tendency for jamming or malfunctioning to occur due to inadvertent engagement of the attachment with other parts of the follower.

Yet another object is the provision of an attachment which is especially rugged in use and immune to damage, such that the device can have a long life expectancy and provide satisfactory performance, even over extended periods.

The above objects are accomplished by a reversing attachment adapted to be applied to a diamond thread screw of the type having intersecting thread grooves, comprising an abutment which is adapted to be positioned at an intersection of the thread grooves for engagement with a driving element of an anti-friction follower that is associated with the screw, so as to prevent passage of the element past the intersection, and detachable securing means for the abutment, in order to maintain it in an operative position at the intersection. In operation, the abutment can be applied at any one of a number of spaced points along the length of the diamond thread screw, the only requirement being that it must be positioned at the intersection of the oppositely-directed diamond thread grooves. Depending upon the configuration of the diamond thread screw, these intersections generally occur at a rate of two intersections per length of thread pitch. Accordingly, a great many individual points are available to accept the attachment, and the follower can thus be reversed in its axial direction of travel at a point which is removed from the desired location by a distance essentially not more than one half of the thread pitch. Accordingly, great flexibility is realizable, and there is completely eliminated the necessity for tailoring the thread form and length of the diamond thread screw to suit a particular application or installation.

The above reversing attachment is exceedingly simple in construction, and very inexpensive to manufacture. In spite of its extreme simplicity, we have found that by virtue of its unique configuration there is permitted a precise, controlled positioning of the abutment at the desired location and with a high degree of accuracy, so as to enable extremely reliable and substantially completely trouble-free performance to be attained. Due to the fact that the attachment fits right into the existing thread grooves, problems with prior art devices involving proper positioning of roller- or ball-engaging abutments are virtually eliminated; furthermore, the shifting of turnable ball elements at the precise, proper time can be readily effected, all with minimum complications and less likelihood of malfunction due to poor tolerances or operator-related error.

Other features and advantages will hereinafter appear.

In the drawings, illustrating a preferred embodiment of the invention:

FIG. 1 is a view, partly in front elevation and partly in vertical section, of the improved mechanical transmission and reversing attachment therefor, particularly illustrating two of the said attachments carried in the screw at spaced-apart locations thereon, and showing an anti-friction follower associated with the screw.

FIG. 2 is a top plan view of the attachment per se, as it would appear when flattened.

FIG. 3 is a front elevation of the attachment, particularly showing a pair of abutments thereof.

FIG. 4 is a side elevational view of the attachment of FIG. 3.

FIG. 5 is a transverse section of the transmission of FIG. 1.

FIG. 6 is a section taken on line 6—6 of FIG. 1, except with the diamond thread screw having been turned through an angle of 90° from the position of FIG. 1.

FIG. 7 is a view like FIG. 6 except showing the ball-type turnable elements carried by the follower occupying different positions with respect to the body thereof.

FIG. 8 is a development of the screw and follower of the transmission of FIG. 1.

FIG. 9 is a fragmentary, transverse section of the transmission of FIG. 1, showing details at the housing- and cage-portions of the follower, the ball-type turnable elements, and the screw.

FIG. 10 is a section of one of two spring rings that are carried by the follower and which releasably retain the ball-type turnable elements of FIGS. 6 and 7 in oppositely-disposed extreme positions, taken on line 10—10 of FIG. 11.

FIG. 11 is a top plan view of the ring, as it would appear when installed in position on the cage portion of the follower.

FIG. 12 is a left-end elevation of the cage portion of the follower.

FIG. 13 is a section taken on line 13—13 of FIG. 12.

FIG. 14 is a section taken on line 14—14 of FIG. 12.

FIG. 15 is a section taken on line 15—15 of FIG. 12.

FIG. 16 is a vertical section of the housing portion of the follower.

FIG. 17 is a right-end elevation of the housing of FIG. 17.

FIGS. 18–21 are developments of the diamond thread screw and the left reversing attachment of FIG. 1, showing the positions occupied by the ball-type turnable elements of the follower as the latter reverses its axial direction of travel.

FIG. 22 is a fragmentary section of the screw and left attachment of FIG. 1.

In FIG. 1 there is illustrated a low-friction, mechanical transmission or traverse mechanism 10 comprising a frame or base 12 having upright support members 14, 16 constituting end bearings for a diamond thread screw 18. A gear 20 at one end of the screw is intended to be engaged by a pinion (not shown) connected to a suitable source of power such as an electric motor. The diamond thread screw 18 comprises thread formations 22 defining crisscrossed, oppositely-directed thread grooves 24, 26, the grooves 24 being of the right-hand variety, with the grooves 26 being of the left-hand type. The diamond thread screw 18 is adapted for turning movement in either direction, with the opposite ends thereof being supported on the bearings 14 and 16, respectively.

Associated with the screw 18 is an anti-friction reversing nut device or follower 28 comprising a nut body 30 having a through bore 32 in which the diamond thread screw 18 is received, and comprising a series of thread-engaging turnable elements in the form of balls 34, 36 and 38 which extend into the bore 32 and are adapted to be received in the thread grooves 24 or 26. Disposed in the bore 32 are needle bearings 40, 42 for engagement with the broad lateral surface of the diamond thread screw 18, in order to reduce friction between the nut and screw as the latter rotates. The needle bearings 40, 42 are of conventional construction, having inner races and outer races, and are preferably press fitted into the nut body 30.

The reversing nut 28 shown in FIGS. 1 and 5–7 further comprises an inner part or cage 44, particularly illustrated in FIGS. 12–15, and an outer part or housing 46, shown in FIGS. 16 and 17. The cage 44 is adapted to be telescopically received in the housing 46 as shown in FIGS. 1, 6 and 7. The inner end surface 48 of the cage 44 is adapted to butt against a corresponding internal annular shoulder 50 (FIGS. 16, 17) of the housing 46 when the two parts are assembled together. A retainer snap ring 52 is receivable in an annular groove 54 in the inner wall of the housing 46 as to permanently retain the cage 44 therein. Set screws 56, which are disposed in a pair of radially extending threaded holes 58 in the housing, are received in corresponding dimpled formations 60 on the outer surface of the cage 44 to thereby hold the latter captive within the housing.

Referring for the moment to FIGS. 9 and 12–15, the cage 44 has a transverse passage 62 through the annular wall thereof. This passage is adapted to receive the ball 34, thus restraining it against axial movement with respect to the cage but enabling free rotational movement thereof. Disposed on opposite sides of the passage 62 are two diametrically-opposed, longitudinal slots 72, 74 (FIGS. 15 and 14, respectively and FIG. 8), each having a width slightly greater than the diameter of the balls 36, 38. The slots 72, 74 extend completely through the annular wall of the cage 44.

Referring again to FIGS. 1, 6 and 7, there are provided yieldable detent means engageable with the ball 36 for holding it in either of two oppositely-disposed extreme positions, the detent means comprising a pair of spring rings 75, 76, one of these being illustrated in FIGS. 10 and 11.

The outer surface of the cage 44 is provided with two grooves 68, 70 extending virtually around its periphery, said grooves being axially spaced from one another as shown in FIGS. 13–15. It can be seen that the grooves intersect the two slots 72, 74 transversely, and provide seats respectively for the two spring rings 75, 76. The spring characteristic of each ring enables it to be merely snapped into the corresponding groove before the cage 44 is inserted into the housing 46. As shown particularly in FIG. 16, corresponding annular clearance grooves 64, 66 are provided on the inner surface of the housing 46. The latter grooves preferably although not necessarily have a slightly greater width than the grooves 68, 70 and are intended to provide limited clearance for the spring rings 75, 76 respectively, when side portions of the latter are momentarily urged radially outward by either of the two movable balls 36, 38, as will be explained more fully below.

FIG. 6 shows the ball 38 disposed in one extreme position, with its other extreme position being illustrated in FIG. 7. Similarly, FIG. 6 shows the ball 36 disposed in one of its extreme positions, with its other extreme position also illustrated in FIG. 7. By such an arrangement it can be seen that the three balls 34, 36 and 38 are all alinged, and occupy the groove 26 for the relative positions illustrated in FIG. 6, whereas in FIG. 7, all three balls are disposed in the oppositely-directed groove 24. Thus, for a given sense of relative rotation of the screw with respect to the nut, the latter can undergo movement in opposite, axial directions with respect to the screw, depending on the relative positions of the "movable" balls 36, 38.

As can be readily seen in FIG. 6, the spring ring 75 engages the ball 36 when the latter is disposed in its left-hand extreme position and the ring 76 engages the ball 38 for the right-hand extreme position (of ball 38). Similarly, the ring 75 engages the ball 38 when the latter is disposed in its left-hand extreme position, with the ring 76 engaging the ball 36 for the right-hand position (of ball 36). As the one movable ball 36 is shifted from one end of its slot 72 to the other end thereof, it momentarily causes the spring ring 75 (and subsequently the other spring ring 76) to yield in a radially outward direction (which is made possible by the corresponding clearance groove 64). Also, shifting of the other movable ball 38 involves by-passing both spring rings 75, 76 in succession, in the reverse order. As particularly shown in FIG. 11, the groove 68 preferably has a stop lug portion 69, engageable with the ends of the spring ring 75 to prevent the latter from rotating in the slot. Such an arrangement insures that only the desired portions of the ring engage the movable balls 36, 38. A similar stop lug portion (not shown) can be provided in the remaining groove 70, in order to prevent the ring 76 from rotating.

FIGS. 1 and 5 illustrate a typical arrangement of traverse mechanism wherein the diamond thread screw 18 is adapted to be rotatably driven, and wherein the nut or follower 28 is held against rotation by means of a slide bar 104, which is substantially parallel and coextensive with the screw 18, and a slide bar follower 106 which is carried by the nut. By such an arrangement, the latter can undergo axial movement with respect to the screw, but is held against rotation.

In accordance with the present invention there is provided as a new article of manufacture, a reversing attachment adapted to be applied to the diamond thread screw 18, at any one of a number of spaced points therealong, for effecting reversal of the axial direction of travel of the nut 28 with respect thereto. The reversing attachment is particularly shown in FIGS. 2–4, and is generally designated by the numeral 82. FIGS. 3 and 4 show the attachment 82 in its normal configuration, wherein it is adapted to mostly encircle the screw 18. FIG. 2 illustrates the configuration that the attachment would have if flattened. Two of the attachments 82 are illustrated in FIG. 1, one attachment being disposed at the left side of the reversing nut, and the second being disposed at the right side of the nut.

Referring again to FIGS. 2 and 3, the attachment 82 is seen to comprise a pair of abutments 86, 88 in the form of shoulders having reversing surfaces. With the abutments 86, 88 positioned at an intersection of the grooves 24, 26, it can be seen that they effectively straddle the intersection and thereby can operate to block or prevent access of the turnable element or ball 36 past or through the intersection.

Attachment 82 further comprises divergent legs 90, 92, the leg 90 being adapted to sit in one of the grooves 24, 26 with the leg 92 being positioned in the oppositely-directed groove. As illustrated in FIG. 1, the legs 90, 92 secure the abutments 86, 88 in their proper position in the groove intersection in such a way that the curved, cylindrical outer surface 94 of the attachment lies slightly below the cylindrical surface 96 of the crest of the thread of the screw 18, as shown in FIG. 22. With such an arrangement, the attachment 82 is seen to lie substantially completely within the confines of the screw 18, essentially with no parts of the attachment extending outside of the cylindrical surface of the crest 96 of the screw thread.

FIGS. 2 and 3 show small holes 98, 100 at the extremities of the legs 90, 92, respectively, which accept the projections of an installation tool (not shown) that can conveniently be used in order to install the attachment 82 in position on the screw 18. The tool spreads the legs 90, 92 from the closed position of FIG. 3, such that the attachment 82 can pass over the screw 18 laterally, or from the side. Thus, the attachment can be merely snapped in place at the intersection corresponding to the location where it is desired that reversal will take place.

The two attachments 82 illustrated in FIG. 1 can be substantially identical to one another. Furthermore, it can be readily understood that either of the attachments can be positioned at any one of the intersections of the grooves 24, 26, either at the left-hand end of the screw in FIG. 1, or the right-hand end thereof, so as to produce the desired stroke length, and the desired reversing locations. Typically, the groove intersections occur at a rate of two intersections per length of thread pitch, and accordingly, the follower 28 can be reversed in its axial direction of travel at a point which is removed from the desired location by a distance essentially not more than one half of the thread pitch.

In accomplishing the proper, precise positioning of the abutment at the desired groove intersection, and by the present invention the attachment has a special configuration at the junction of the legs 90, 92, adapted to be positioned in an adjacent intersection of the grooves. As shown in FIG. 3, the legs 90, 92 form a discontinuous ring. Two pairs of divergent shoulders 110, 112 and 114, 116 are provided, for engagement with corresponding tip portions of the diamond thread. As particularly shown in FIG. 1, the right-hand attachment is positioned such that the shoulders 110, 112 cradle the tip portion 118 of the thread (shown in dotted outline in the figure), with the oppositely-disposed shoulders 114, 116 being intended to cradle the adjacent tip portion 120. Also, there is a pair of small notches 122, 124 at the junctures of the shoulders, these receiving the sharp tips of the diamonds and at the same time providing an indication to the user of the proper seating of the attachment. It has been found that with the above configuration, a precise and controlled positioning or locking in place of the attachment can be attained with a minimum of time and effort. Correct seating of the attachment can be readily determined by the user, so as to facilitate quick installation and minimizing the possibility of malfunction at a later time, due to improper installation.

The operation of the traverse mechanism and reversing attachment therefor can now be readily understood by referring to FIGS. 1, 8, and 18–21. For purposes of explanation, it will be assumed that the ball 38 is disposed in its right-hand extreme position as shown in FIG. 6. These are the same relative positions as shown in FIG. 1. With the screw rotating in the direction indicated in FIG. 1, it will be seen that the balls 34, 36, 38 all occupy the left-hand groove 26 of the diamond thread screw 18. Such rotation will give rise to movement of the reversing nut 28 toward the left in FIG. 1. FIGS. 8 and 18–21 show a development of the screw, with the positions of the balls being indicated by solid lines, and the oppositely-disposed extreme positions of balls 36, 38 being designated by dotted lines. Under the above circumstances, the reversing nut 28 will be traveling toward the left in FIG. 18. FIG. 8 is a development of the diamond thread screw 18 and housing 44 of the nut, and illustrating the positions that the balls 34, 36 and 38 would occupy with the nut traveling toward the left in FIG. 1, and with the screw rotating in the direction indicated when the nut arrives at the location of the left reversing attachment 82. Reversal in the axial direction of movement will be effected by the direct engagement of the leading ball 36 with the attachment. Such engagement is illustrated in FIG. 18. As this occurs, it can be seen that this leading ball 36 is blocked or prevented from entering or passing the intersection of the thread grooves 24, 26, by the abutment 86. The ball 36 is thus shifted with respect to the nut toward the right, while the nut continues to travel toward the left due to the continued engagement of the fixed ball 34 and the wall of the groove 26. Continued rotation of the screw gives rise to further movement of the nut toward the left such that the fixed ball 34 and the movable balls 36, 38 will eventually assume the positions illustrated in FIG. 20. It is at this point that the axial direction of movement of the nut begins to reverse, since the ball 36 has reached its opposite extreme position and begins to carry the nut toward the right; similarly in FIG. 20, further rotation of the screw will effect additional movement of the nut toward the right, thus shifting the trailing ball 38 toward the left with respect to the nut 28. Such shifting of this trailing ball occurs because both the fixed ball 34 and the one movable ball 36 are carrying the nut toward the right, and the trailing ball 38 is confined to switch from the left-hand groove 26 to the right-hand groove 24 in the vicinity of the abutments 86, 88. From the position of FIG. 21, the nut will continue traveling toward the right until it arrives at the location of the right-hand reversing attachment 82 (FIG. 1).

Upon its arrival, the leading ball 36 will be engaged by the reversing abutment 88 and shifted toward the left thereby, thus effecting a second reversal of axial direction of travel with respect to the screw. The reversing nut thus undergoes a simple reciprocating movement between the locations of the two reversing attachments 82. During the travel of the nut along the screw, it will be understood that the balls 34, 36 and 38 can all rotate about axes of their own, so as to reduce sliding friction to a minimum.

With the nut traveling toward the right as in FIG. 21, any load applied thereto (in a direction tending to oppose its movement) is carried by the balls 34, 36 when neither is at a groove intersection. When either of the balls 34, 36 crosses a groove intersection, the load is carried by the other until the intersection is passed. The arrangement is such that at least one ball is available to carry the load at all times.

From the foregoing it will now be understood that the nut 28 of FIG. 1 can traverse the diamond thread screw 18 from the location of the left-hand attachment 82 to the location of the right-hand attachment 82 in FIG. 1, and then automatically reverse its direction and proceed back to the first attachment, and so on, all without requiring reverse turning of the screw. During the travel of the nut in either of its two axial directions, the load will always be carried by at least one ball. For a given sense of rotation of the screw with respect to the nut, only two balls are required to produce an operative device. For the conditions of rotation of the screw 18 shown in FIG. 1, the balls 34, 36 carry the load, and the trailing ball 38 could accordingly be omitted. Reversal of the nut is accomplished at the left end of the stroke by the engagement of the ball 36 by the abutment 86 of the left-hand reversing attachment in FIGS. 1 and 18, and at the right end of the stroke by the engagement of the same ball 36 with the abutment 88 of the right-hand reversing attachment 82 of FIG. 1. If the direction of rotation of the screw were reversed, however, balls 34 and 38 would carry the load, and the trailing ball 36 could be omitted. In the interest of making a complete disclosure, at least three balls have been shown in the device discussed above.

By virtue of the fact that the load is always carried by at one ball, there is no irregularity of movement or interference at the crossover points of the threads. For such condition the load will be fully sustained by the remaining ball until the crossover point has passed, after which two balls will again divide the load. Therefore, there is continuity in sustaining any load which may be applied to the nut 28. Even at the end of its movement in either direction, the nut will continue to have a smooth transition due to the fact that the ball 34 continues to carry the load as it traverses either attachment 82.

By virtue of the foregoing construction and operation the nut 28 experiences a smooth movement at all times, regardless of the presence of the crossover points in the diamond thread. The shifting of one or the other of the direction-reversing balls requires relatively little force to overcome the resilient detent action of the spring ring. Such small force is not noticeable during normal operation of the traversing device, yet the detent action of the rings is effective at all times to maintain the shiftable balls in their proper, operative positions.

The provision of the spring rings not only effects a desirable simplicity and economy in the traverse construction, but also makes for fool-proof operation since such rings directly engage the balls with no intermediary parts, and since the forces and masses involved with controlling the shifting of the balls are extremely small and involve simple movements.

Also, the above construction involving the novel reversing attachment 82 is seen to have the following advantages, resulting in simplified manufacturing procedures and reduced overall cost. Due to the fact that the attachment can be made as a single stamping from spring metal, the cost of the product can be kept to an absolute minimum. Installation is readily effected, without the need for special tools. The legs of the attachment, when fabricated in accordance with the invention and as shown in FIGS. 2-4, can be simply momentarily spread apart and thereafter slipped over the diamond thread screw laterally, or from the side of the screw, and snapped into place in the desired position. Thereafter, it will remain in place by virtue of the spring characteristic of the part, without additional fastening devices being required. In addition, in the event that it is desired to change location of the point of reversal, it is merely necessary to spread the legs of the attachment, after which the same can be moved and re-installed at a different position on the screw.

With the unique configuration and small physical size wherein the outer surface 94 is essentially completely below or inside of the crest 96 of the diamond thread screw, there results an especially neat and compact installation; thus the likelihood of the attachment 82 inadvertently coming into contact with other parts of the apparatus is greatly minimized. In addition, where it is desired to employ needle bearings similar to those indicated by the numerals 40, 42 in FIG. 1, it is essential that any reversing structures carried by the screw not protrude into the path of such bearings as the nut is approaching one or the other of the reversing points. The present device fulfills this requirement nicely, since the needle bearings 40, 42 slide over the surface 96 of the screw thread, and merely pass over the outer surface 94 of the attachment 82 without engaging the same, or encountering interference therefrom.

The present reversing attachment solves many of the problems which were inherent in the devices of the prior art, especially problems involving proper positioning of the abutment that accomplishes the shifting of the turnable elements carried by the follower or nut. As pointed out above, in a reversing construction such as that described above, it is necessary that shifting of the driving elements carried by the nut occur when the element is at an intersection of the thread grooves. Failure to observe this requirement can result in jamming, and possible damage to the thread formation in the form of chipped teeth, etc. The present device effectively solves the problem of initiating the shifting of the driving element at the proper point, since the abutment 86 of the attachment 82 is seated precisely in the intersection of the thread grooves, by virtue of the guide provided by the groove walls for the legs 90, 92, and the engagement of the shoulders 110, 112 and 114, 116 with the groove walls. In effect, the abutment 86 accomplishes the shifting with essentially the same precision as the curved reversing grooves at the end of the thread formations on the prior art devices, except with the added benefits involving increased flexibility in determining the reversal locations; this results in a product which is much more versatile and adaptable to different installations than was true with such prior devices.

It will now be seen from the foregoing that we have provided a unique, especially simple and workable reversing attachment for a mechanical traverse device of the type employing a diamond thread screw. The construction is capable of being fabricated by simple manufacturing operations, is especially small and compact and is capable of handling substantial loads with high reliability over extended periods of operation where adequate lubrication is provided for the relatively movable surfaces. The device is thus seen to represent a distinct advance and improvement in the technology of traverse mechanisms.

Variations and modifications are possible without departing from the spirit of the invention.

We claim:

1. As a new article of manufacture, a reversing attachment adapted to be applied to a diamond thread screw of the type having intersecting thread grooves, comprising in combination:
   (a) an abutment adapted to be positioned in a groove at any one of various intersections thereof for engagement with a driving element of an anti-friction follower that rides in the grooves of the screw, said abutment preventing passage of said element past said one intersection, and
   (b) means for detachably securing the abutment to the screw at said one intersection to maintain it in its operative position,
   (c) said securing means comprising a snap ring adapted to occupy two intersecting thread grooves, one end of said ring constituting the said abutment.

2. The invention as defined in claim 1, wherein:
   (a) the securing means includes means locking the abutment against shifting in the thread groove.

3. The invention as defined in claim 1, wherein:
   (a) the snap ring comprises a pair of angularly disposed legs adapted to wrap around the screw and occupy said grooves thereof.

4. The invention as defined in claim 2, wherein:
   (a) the locking means comprises a configuration carrying said abutment and adapted to occupy another groove intersection.

5. The invention as defined in claim 1, and further including:
   (a) an additional abutment connected with said securing means and adapted to be positioned in another groove of the diamond thread screw at the same intersection as the first-mentioned abutment,
   (b) said additional abutment comprising the other end of the snap ring.

6. The invention as defined in claim 2, wherein:
   (a) the configuration of the locking means has notches adapted to receive pointed portions of the diamond thread.

7. The invention as defined in claim 1, wherein:
   (a) the abutment and securing means are constituted as a single piece of spring metal.

8. A reversing attachment as defined in claim 1, in combination with:
   (a) a diamond thread screw having intersecting thread grooves, and
   (b) an anti-friction follower having a driving element adapted to ride in either of the thread grooves.

9. The invention as defined in claim 8, wherein:
   (a) the driving element of the follower is shiftable axially of the same,
   (b) the abutment directly engages the driving element of the follower and effects the said shifting of the same in an axial direction with respect to the screw, so as to reverse the axial direction of travel of the follower.

10. The invention as defined in claim 9, wherein:
    (a) the driving element that is directly engaged by the abutment is a ball which is capable of rotating about an axis of its own as the follower traverses the screw.

11. As a new article of manufacture, a reversing attachment adapted to be applied to a diamond thread screw of the type having intersecting thread grooves, comprising in combination:
    (a) an abutment adapted to be positioned in a groove at any one of various intersections thereof for engagement with a driving element of an anti-friction follower that rides in the grooves of the screw, said abutment preventing passage of said element past said one intersection,
    (b) means for detachably securing the abutment to the screw at said one intersection to maintain it in its operative position, and
    (c) an additional abutment connected with said securing means and adapted to be positioned in another groove of the diamond thread screw at the same intersection as the first-mentioned abutment
    (d) the securing means comprising a discontinuous ring having at its ends the said abutments.

12. The invention as defined in claim 11, wherein:
    (a) the said discontinuous ring has intermediate its ends a locking configuration adapted to occupy another groove intersection.

13. As a new article of manufacture, a reversing attachment adapted to be applied to a diamond thread screw of the type having intersecting thread grooves, comprising in combination:
    (a) an abutment adapted to be positioned in a groove at any one of various intersections thereof for engagement with a driving element of an anti-friction follower that rides in the grooves of the screw, said abutment preventing passage of said element past said one intersection, and
    (b) means for detachably securing the abutment to the screw at said one intersection to maintain it in its operative position,
    (c) all portions of said abutment and said securing means lying below the crests of the diamond thread.

14. As a new article of manufacture, a reversing attachment adapted to be applied to a diamond thread screw of the type having intersecting thread grooves, comprising in combination:
    (a) an abutment adapted to be positioned in a groove at any one of various intersections thereof for engagement with a driving element of an anti-friction follower that rides in the grooves of the screw, said abutment preventing passage of said element past said one intersection, and (b) means for detachably securing the abutment to the screw at said one intersection to maintain it in its operative position, (c) the abutment and securing means being constituted as a single piece of spring metal,
(d) substantially all portions of the said single piece lying within the confines of the intersecting grooves.

* * * * *